United States Patent
Bertrand (10) Patent No.: US 7,375,940 B1
(45) Date of Patent: May 20, 2008

(54) TRANSFORMER INTERFACE FOR PREVENTING EMI-BASED CURRENT IMBALANCES FROM FALSELY TRIGGERING GROUND FAULT INTERRUPT

(75) Inventor: Jeffrey John Bertrand, Hazel Green, AL (US)

(73) Assignee: Adtran, Inc., Huntsville, AL (US)

( * ) Notice: Subject to any disclaimer, the term of this patent is extended or adjusted under 35 U.S.C. 154(b) by 640 days.

(21) Appl. No.: 11/091,213

(22) Filed: Mar. 28, 2005

(51) Int. Cl.
*H02H 3/16* (2006.01)
*H02H 3/26* (2006.01)

(52) U.S. Cl. ..................................... 361/46
(58) Field of Classification Search ............... 361/42, 361/46
See application file for complete search history.

(56) References Cited

U.S. PATENT DOCUMENTS 3,506,906 A * 4/1970 Nestor ........................ 361/45
3,611,035 A * 10/1971 Douglas ...................... 361/46
4,667,262 A * 5/1987 Maier ......................... 361/42
4,931,894 A * 6/1990 Legatti ....................... 361/45

* cited by examiner

*Primary Examiner*—Ronald W Leja
(74) *Attorney, Agent, or Firm*—Allen, Dyer, Doppelt, Milbrath & Gilchrist, P.A.

(57) ABSTRACT

A transformer interface prevents a false ground fault interrupt in a power supply arrangement. The power supply arrangement has a line wire and a neutral wire connected by way of a ground fault interrupt circuit to an electrically powered device, to which a ground wire is also coupled. The interface has current imbalance sensor transformer windings coupled to the line and neutral wires. A ground wire current sensor transformer winding is coupled to the ground wire. A detector transformer winding produces a signal that triggers operation of the ground fault interrupt circuit, in response to the difference between currents produced by the current imbalance sensor transformer windings exceeding detected ground wire current by a prescribed value.

19 Claims, 5 Drawing Sheets

TRANSFORMER INTERFACE FOR PREVENTING EMI-BASED CURRENT IMBALANCES FROM FALSELY TRIGGERING GROUND FAULT INTERRUPT

FIELD OF THE INVENTION

The present invention relates in general to ground fault protection circuitry for electronic equipment products, such as but not limited to communication products and the like, and is particularly directed to a transformer interface arrangement for interfacing a power source through a ground fault interrupt circuit to an electrical device, which contains electromagnetic interference filter circuitry that can produce an internal current imbalance in the ground fault interruption circuit and falsely trigger a ground fault interruption event. The transformer interface arrangement of the present invention is configured to mutually cancel out internal current imbalances, such as those associated with by-pass filtering of electromagnetic interference, so as to prevent a ground fault interrupt from being erroneously triggered.

BACKGROUND OF THE INVENTION

Manufacturers of electrical equipment and appliances, such as those designed to operate at 110 VAC or 220 VAC, have customarily incorporated ground fault interrupt (GFI) circuitry in the supply path from the power supply input derived from a power outlet, such as a wall outlet, and the electrically powered device or load proper, as a safety measure to protect the user. A typical example of a power supply interconnect network configured for this purpose is diagrammatically illustrated in FIG. 1 as comprising an upstream power transformer 10 from which a 220 VAC line is coupled to a circuit breaker panel 12. A respective leg of the power supply line proper includes a line or 'hot' lead 21 and a return or neutral lead 22. From the circuit breaker panel 12 the leads are typically fed to and terminate at a female electrical receptacle that is mounted at a wall outlet 30, and may include a connection from earth ground to the neutral lead. The electrical appliance or equipment 40 that is to be powered from the wall outlet contains a GFI circuit 50 as part of the power feed that is used to connect the appliance to the wall outlet receptacle. GFI circuit 50 typically contains a sense transformer 51 containing a pair of windings derived from the line voltage lead and the return or neutral lead which are used to deliver power through a GFI-controlled switch 55 to an electrically powered device or load 60.

Figure 1:
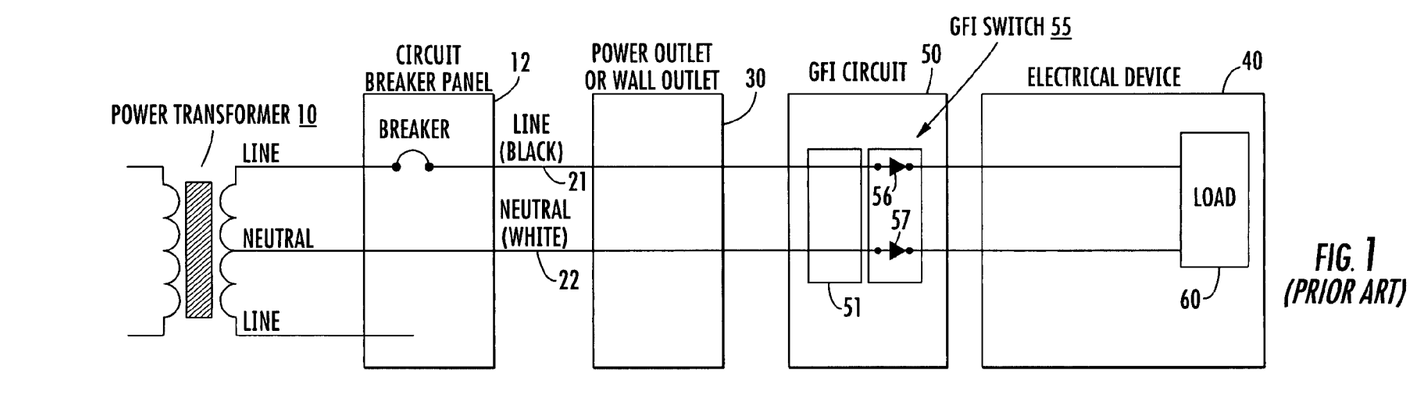
FIG. 1 diagrammatically illustrates a conventional power supply interconnect network containing a ground fault interrupt circuit for supplying AC power to electrical equipment.

The GFI circuit 50 operates as follows. As long as the equipment is connected as shown in FIG. 1 and there is no inadvertent contact (as by way of an equipment user) between the power supply leads and ground, then whatever current is drawn by the load by way of the line voltage lead 21 will be returned to the source (the line power transformer) via the neutral lead 22. As a result, the magnetic fields produced by the respective line voltage lead and neutral lead windings in the sense transformer 51 will balance one another, so that there will be no resulting differential magnetic field of sufficient strength to open the contacts 56 and 57 of GFI switch 55. However, should there be an inadvertent contact at the electrical device between one of the power supply leads and ground, then the magnetic fields produced by the respective line voltage lead and neutral lead windings in the sense transformer 51 will be out of balance, yielding a net magnetic field of sufficient strength to cause the GFI switch 55 to open its contacts 56 and 57, thereby interrupting the connection from the power supply and the electrical device and ostensibly protecting the user.

Figure 2:
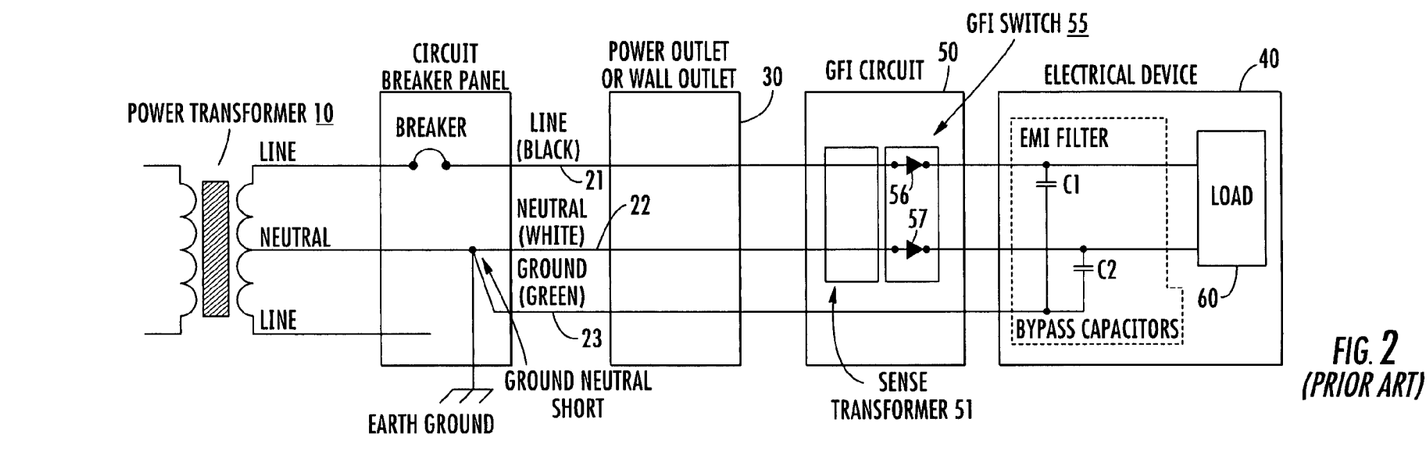
FIG. 2 diagrammatically illustrates a conventional power supply interconnect network containing a ground fault interrupt circuit for supplying AC power to electrical equipment containing EMI suppression circuitry.

Now although GFI circuits of the type shown in FIG. 1 have worked reasonably well, they have recently begun to suffer faulty operation owing to the incorporation of additional protection circuitry that is now becoming commonplace in modern electronic equipment. Specifically, as shown in FIG. 2, it is now common practice to incorporate electromagnetic interference (EMI) filter capacitors as part of the electronic equipment, in order to control the emission of high frequency electrical (digital) noise, which is generated by the internal circuitry of the equipment. As shown in FIG. 2, the EMI protection customarily consists of a pair of high frequency by-pass capacitors C1 and C2, which are respectively connected between the line voltage lead 21 and the neutral lead 22 and an earth ground lead 23, so that they provide a current path for high frequency noise from the line or neutral wires to earth ground. However, as a result of these by-pass capacitors, some of the return current now flows through the earth ground lead, so that there is an imbalance in the currents flowing through the respective windings of the sense transformer 51 of the GFI switch 55. This leads to a 'false' triggering of the GFI switch, as the electrical device has been designed to include EMI filtering, which is working correctly. This inability of the GFI circuit to discriminate between designed-in current paths to ground (such as EMI filters which may produce a current imbalance between the line and neutral leads) and a true external ground fault, which may be hazardous to the user, constitutes a problem for users of GFI-protected equipment.

SUMMARY OF THE INVENTION

In accordance with the present invention, this problem is successfully addressed by a new and improved transformer-based ground fault interruption circuit, which employs an auxiliary, toroidally configured transformer interface, trifilar or quadrifilar windings of which are selectively distributed in the line, neutral and earth ground lead paths, in such a manner that only a true ground fault will trigger the opening of a ground fault interrupt switch. Pursuant to a first, dual transformer embodiment of the invention, the 'hot' line lead of a power supply cable plant is coupled through a first winding of a first toroidally wound transformer core to one of the normally closed contacts of a ground fault interrupt switch feeding an electrically driven load (appliance, equipment). The use of a toroidal transformer configuration is preferred, as it confines the magnetic fields produced by its windings to the circular core and isolates the fields from external fields, making it self-shielding. Using trifilar and quadrifilar windings enhances coupling between the windings and helps cancel external common mode noise associated with external electrostatic and magnetic fields. Moreover, trifilar and quadrifilar windings enhance magnetic field cancellation and balance, since each winding wire has the same length and is tightly coupled to the other windings. The number of turns and the winding wire size is based on load current, line frequency and toroid ferrite material.

In addition to the first transformer winding, second and third windings are wound on the toroidal ferrite core in a trifilar manner. The neutral lead is coupled through the second toroidal winding to the other of the normally closed contacts of the ground fault interrupt switch feeding the load. The third winding is a 'current sense' winding respective ends of which are connected in parallel with first and second ends of a fourth 'current sense' toroidal winding which is wound on the core of a second toroidal transformer. The purpose of the third 'current sense' winding of the first transformer is to detect a differential magnetic field in the core of the first transformer owing to an imbalance in the currents in the line and neutral leads due to EMI coupling to the ground lead, and to couple a 'sensed' current representative of the detected differential magnetic field to the second transformer, wherein it is intended to cancel the magnetic field produced by current flowing through the ground lead.

To this end, the second transformer contains a fifth, ground current detection winding wound around its toroidal core. The ground lead from the power supply is coupled to a first end of the fifth winding, while a second end of the fifth winding is coupled to the earth ground lead, to which the respective capacitors of the EMI filter employed by the electrically powered device are coupled. In the absence of a true ground fault, any ground currents in the ground lead will be coupled to the fifth winding and produce a magnetic field within the core of the second transformer that effectively cancels the magnetic field induced in its core by fourth, current sense winding. The second transformer further includes a sixth 'ground fault sensing' toroidal winding, respective first and second ends of which are coupled to drive inputs of the ground fault interrupt switch. For a true ground fault, the magnetic fields induced in the core of the second transformer by the respective fourth and fifth windings will not be the same, so as to yield a non-zero differential magnetic field that is detected by the sixth, 'fault sense' winding, producing a current that is used to trip the GFI switch.

Rather than configure the transformer interface of a pair of intercoupled transformers (the first embodiment), the same functionality can be achieved by a relatively compact structure, which employs a single quadrifilar wound transformer for coupling line, neutral and ground leads of a power supply cable plant to an electrically powered device and a ground fault interruption circuit therefor. As in the first embodiment the 'hot' line lead is coupled through a first toroidal winding to a first normally closed contact of the GFI switch. Also, as in the first embodiment, the neutral lead is coupled through a second toroidal winding to a second normally closed contact of the GFI switch. The earth ground lead from the power supply is coupled through a third winding to the earth ground lead to which the EMI filter capacitors are connected.

The second embodiment further includes a fourth winding having respective first and second end terminals coupled to the GFI switch which controls the opening and closure of the GFI switch contacts. The second embodiment operates as follows. In the case of normal operation (including EMI protection) where no ground fault is present, line current from the power source cable plant is coupled through the first transformer winding and then through the line to the normally closed contacts of the GFI switch feeding the load. This flow of line current through the first transformer winding induces a first magnetic field component within the toroidal core of the transformer. Return current on the neutral lead from the load is coupled through the normally closed contact of the GFI switch, the neutral lead and the second toroidal winding of the transformer.

Due to the presence of EMI filter by-pass capacitors coupled to earth ground, the magnitude of the current returned over the neutral lead is less than that supplied over the hot line, so that the magnetic field induced in the transformer core by the current flowing through the second winding will be less than that induced by the first winding, resulting in a non-zero differential magnetic field being produced in the transformer core. This magnetic field is countered by the flow of current through via the ground lead through the third winding of the transformer, so that the resultant magnetic field in the transformer's core is zero, and no current is induced in the fourth (current sense) winding. Therefore, as in the first embodiment, with no current induced in the current sense winding, no signal is delivered to the GFI switch to open its contacts, so that the filtering of EMI noise (internal current imbalance) has no effect on the operation of the circuit.

For the case of a ground fault, associated with a user coming in contact with ground and the load, line current from the power source cable plant is coupled through the first transformer winding and then through the line to the normally closed contacts of the GFI switch feeding the load. This flow of line current through the first winding induces a first magnetic field component within the toroidal core of the transformer. However, return neutral current from the load, rather than being coupled through the normally closed contact of the GFI switch, the neutral lead and the second toroidal winding of the transformer is, instead, partially diverted to earth ground by the user, so that the current over the neutral lead is considerably reduced in comparison to that supplied over line. This causes the magnetic field induced in the transformer core by the current flowing through the second winding to be significantly less than that induced by the first winding, resulting in a substantial non-zero differential magnetic field produced in the core. A further current component is coupled over the earth ground lead to the third winding owing to the presence of the EMI filter capacitors, as in the first embodiment, and induces a ground current-based magnetic field in the core. However, this magnetic field is much smaller than the substantial, non-zero differential magnetic field induced by the currents supplied to the first and second windings. This means that the magnetic fields induced into the transformer core do not cancel each other, leaving a non-zero differential magnetic field in the transformer core. As a consequence, a resultant non-zero current is induced in the ground fault sense winding. This current is supplied as a switch activation signal to the GFI switch from the output leads from the fourth winding, causing its associated contacts open, so as to interrupt the ground fault, and protect the user, as intended.

DETAILED DESCRIPTION

Before describing the improved transformer interface arrangement, for interfacing a power source through a ground fault interrupt circuit to an electrical device which contains electromagnetic interference filter circuitry, in accordance with the present invention, it should be observed that the invention resides primarily in a prescribed novel combination of electrical and magnetic circuits and components therefor. Consequently, the configurations of such circuits and components and the manner in which they may be interfaced with conventional power supply leads and ground fault interrupt circuitry have, for the most part, been illustrated by readily understandable schematic block diagrams, which show only those specific features that are pertinent to the present invention, so as not to obscure the disclosure with details which will be readily apparent to those skilled in the art having the benefit of the description herein. Thus, the block diagrams and header field diagrams presented here are primarily intended to show major components of an embodiment of the invention in a convenient functional grouping, whereby the present invention may be more readily understood.

Figure 3:
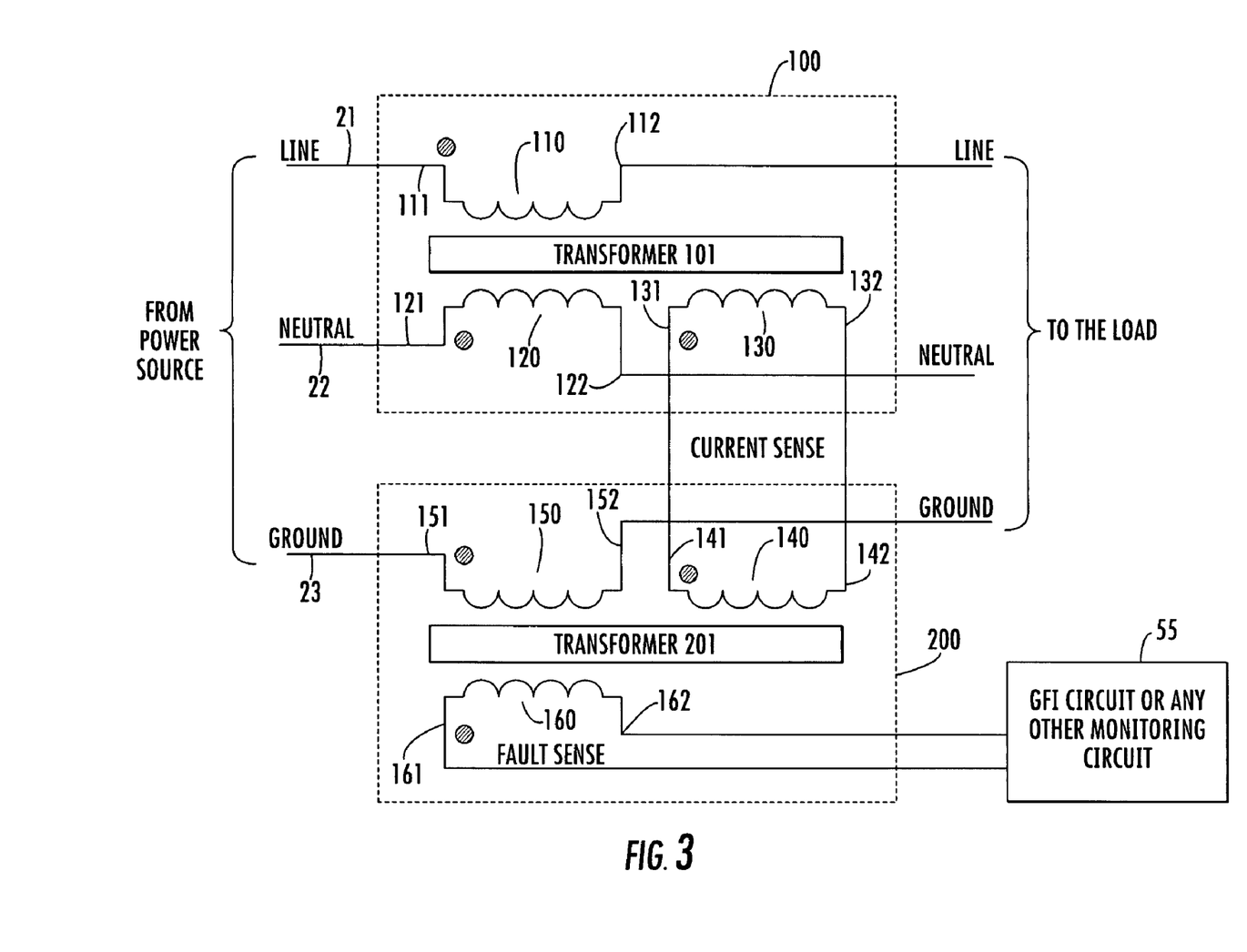
FIG. 3 shows a first, dual transformer embodiment of the transformer interface arrangement of the present invention for coupling line, neutral and ground leads of a power supply cable plant to an electrically powered device and a ground fault interruption circuit therefor.
Figure 4:
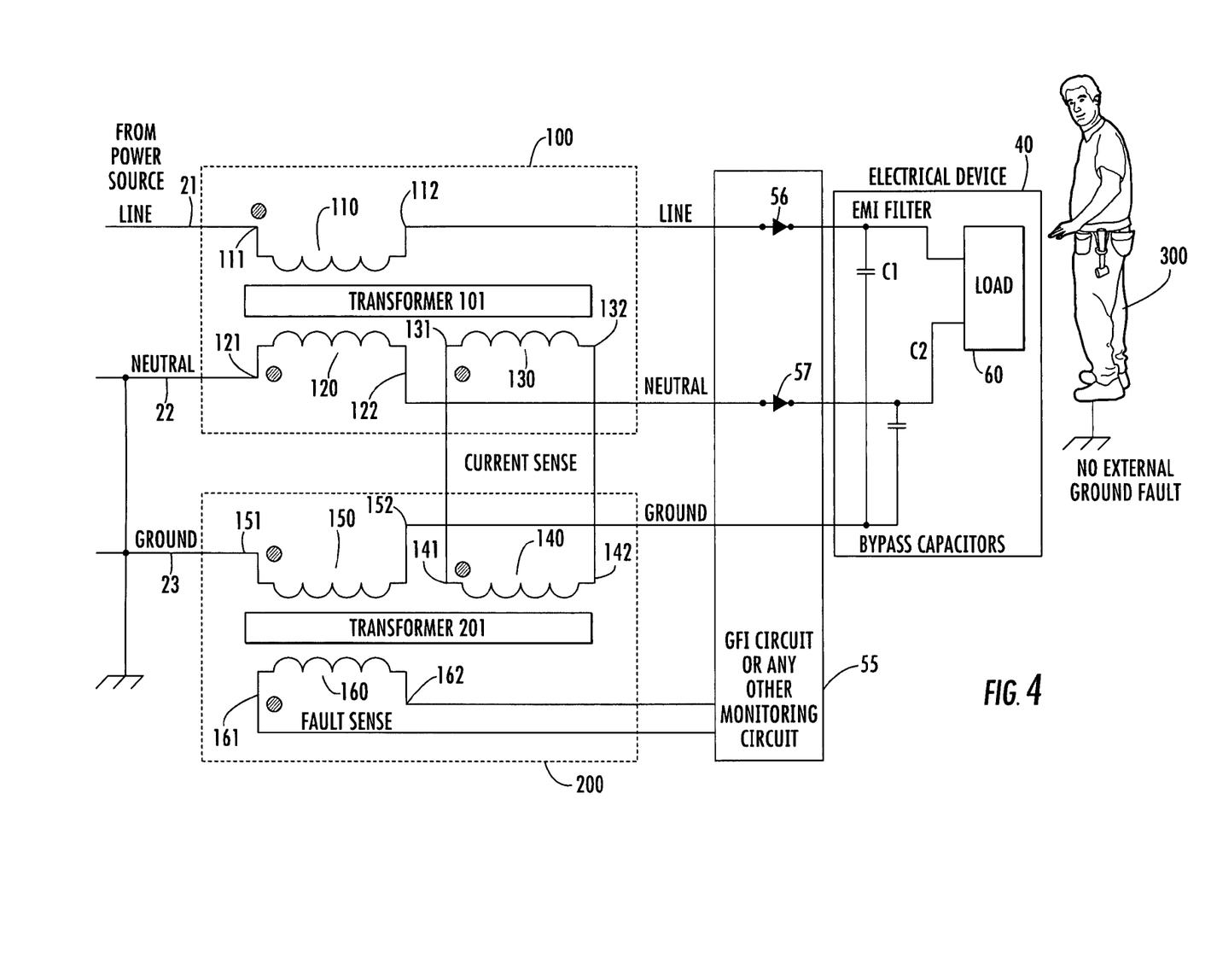
FIG. 4 shows the operation of the dual transformer embodiment of FIG. 3 for normal operation absent a ground fault.

Attention is now directed to the FIG. 4, which shows a first, dual transformer embodiment of the transformer interface arrangement of the present invention for coupling line, neutral and ground leads of a power supply cable plant to an electrically powered device and a ground fault interruption circuit therefor. As shown therein the 'hot' line lead 21 is coupled to a first end 111 of a first transformer winding 110 of a first transformer 100. A second end 112 of the first transformer winding 110 is coupled to one of the normally closed contacts of the GFI switch feeding the load. Pursuant to a preferred embodiment, transformer 100 and all other transformers used in the present invention comprise toroidal ferrite cores around which are multiple turns of trifilar or quadrifilar windings. In the first embodiment, the windings are trifilar windings; in the second embodiment, the windings are quadrifilar windings.

A toroidal transformer configuration is preferred, as it confines the magnetic field to the core and isolates it from external fields, making it self-shielding. Using trifilar and quadrifilar windings enhances coupling between the windings and helps cancel external common mode noise associated with external electrostatic and magnetic fields. Trifilar and quadrifilar windings also enhance magnetic field cancellation and balance because each winding wire has the same length and is tightly coupled to the other windings. The number of turns and the winding wire size is based on load current, the line frequency and the toroid ferrite material. In the first embodiment, the first transformer winding 110 is wound upon a ferrite toroidal core 101, around which are wound a pair of additional windings 120 and 130, with windings 110, 120 and 130 being wound in a trifilar manner.

The neutral lead 22 is coupled to a first end 121 of a second toroidal winding 120, a second end 122 of which is coupled to the other of the normally closed contacts of the GFI switch feeding the load. Also wound on the ferrite toroidal core 101 of the first transformer is a third 'current sense' toroidal winding 130, respective first and second ends 131 and 132 of which are connected in parallel with first and second ends 141 and 142 of a fourth 'current sense' toroidal winding 140, which is wound on toroidal core 201 of a second transformer 200. The purpose of the third 'current sense' winding 130 of the first transformer 100 is to detect a differential magnetic field in the core 101 of the first transformer owing to an imbalance in the currents in the line and neutral leads 21 and 22, due to EMI coupling to the ground lead, and to couple a 'sensed' current representative of the detected differential magnetic field to the second transformer, wherein it is intended to cancel the magnetic field produced by current flowing through the ground lead.

For this purpose, the second transformer 200 contains a fifth, ground current detection toroidal winding 150 wound around its toroidal core 201. The ground lead from the power supply is coupled to a first end 151 of winding 150, while a second end 152 of toroidal winding 150 is coupled to the earth ground lead 23, to which the respective capacitors of the EMI filter employed by the electrically powered device are coupled, as described above. As will be described, in the absence of a true ground fault, any ground currents in the ground lead 23 will be coupled to winding 150 and produce a magnetic field within the toroidal ferrite core 201 of transformer 200 that effectively cancels the magnetic field induced in the core of transformer 200 by the current sense winding 140. The second transformer 200 further includes a sixth 'ground fault sensing' toroidal winding 160, respective first and second ends 161 and 162 of which are coupled to drive inputs of the GFI switch 55. As will be described, for a true ground fault, the magnetic fields induced in core 201 of transformer 200 by the respective fourth and fifth windings 140 and 150 will not be the same, so as to yield a non-zero differential magnetic field that is detected by the sixth, 'fault sense' winding, producing a current that is used to trip the GFI switch 55.

Figure 5:
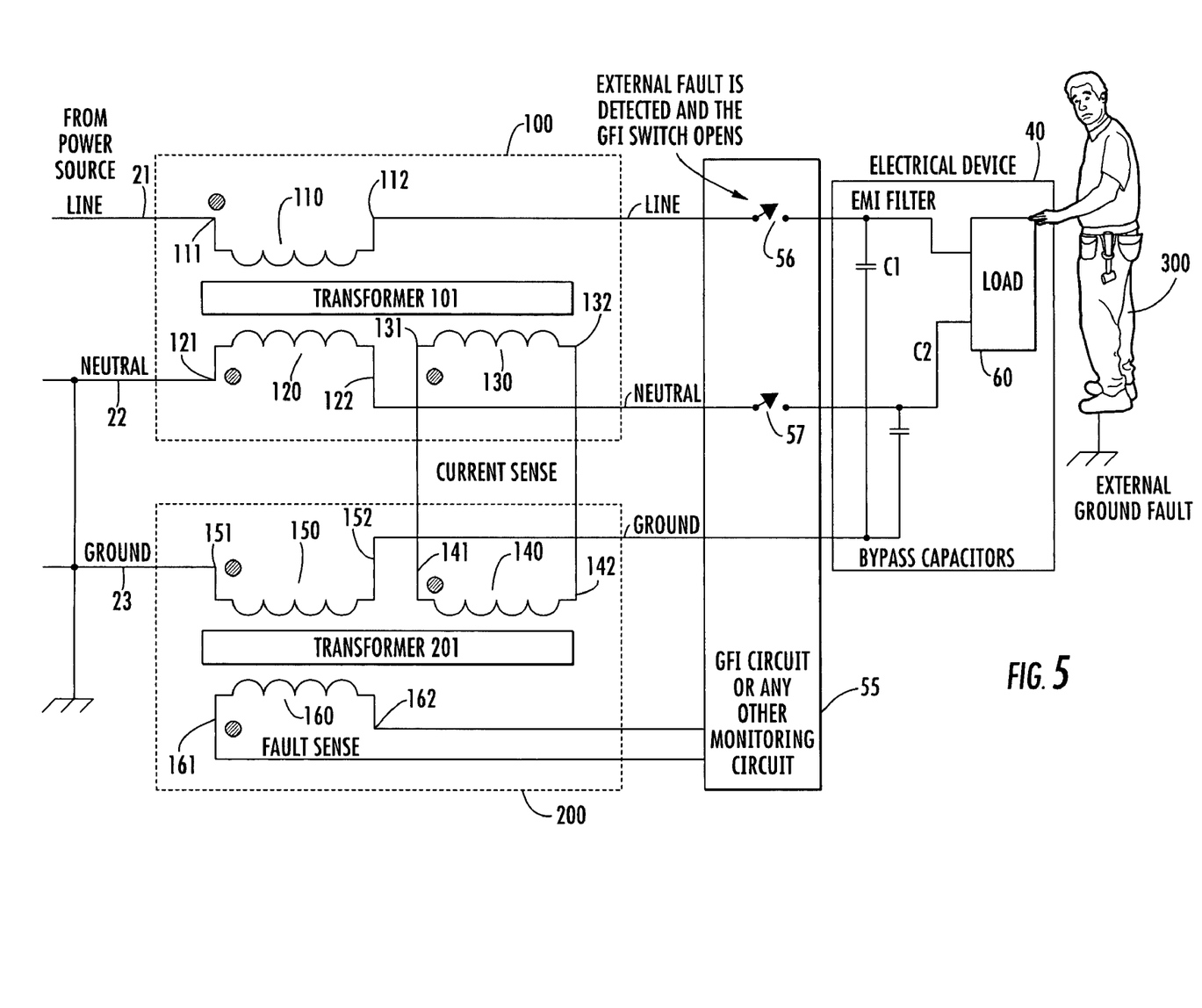
FIG. 5 shows the operation of the dual transformer embodiment of FIG. 3 in the presence of a ground fault.

The operation of the dual transformer interface embodiment of FIG. 3 will now be described with reference to FIGS. 4 and 5. FIG. 4 represents the case of normal operation (including EMI protection) where no ground fault is present, whereas FIG. 5 represents the occurrence of a ground fault. Referring initially to FIG. 4, for normal operation, line current from the power source cable plant is coupled through the first transformer winding 110 of transformer 100, and then through the line to the normally closed contacts 56 of the GFI switch 55 feeding the load 60. This flow of line current through the first transformer winding 110 induces a first magnetic field component within the toroidal core 101 of the first transformer 100. Return neutral current from the load 60 is coupled through the normally closed contact 57 of the GFI switch, the neutral lead and the second toroidal winding 120 of transformer 100. Due to the presence of EMI filter by-pass capacitors C1 and C2 coupled to earth ground, the magnitude of the neutral current returned over the neutral lead is less than that supplied over line 21. As a result, the magnetic field induced in core 101 by the current flowing through the second winding 120 will be less than that induced by the first winding 110, resulting in a non-zero differential magnetic field being produced in the toroidal core 101 of the first transformer 100. This magnetic field is coupled to the third, current sense winding 130 of the first transformer 100, so that a current is induced in the third winding 130. This induced current is coupled to the fourth, current sense winding 140 wound around the toroidal core 201 of the second transformer 200, so as to induce a magnetic field in core 201 that is equal to the non-zero differential magnetic filed produced in the core 101 of the first transformer 100.

The current flowing in the ground lead 23 owing to the presence of the EMI filter capacitors C1 and C2 (which resulted in the non-zero differential magnetic field be generated in the core 101 of the first transformer) is supplied through the fifth winding 150, so as to induce in core 201 of the second transformer 200 a non-zero magnetic field of the same magnitude, but opposite polarity, of that induced by the current supplied to the fourth, current sense winding 140 by the third, current sense winding 130. This means that the two magnetic fields induced into the core 201 of transformer 200 by windings 140 and 150 cancel each other, leaving a net zero magnetic field in the core 201. As a result, no current is induced in the ground fault sense winding 160 of the second transformer 200, so that no signal is supplied to the GFI switch 55, and its associated contacts 56 and 57 remain closed. Thus, EMI noise does not cause an erroneous tripping of the GFI circuitry.

Consider now the case of FIG. 5, which diagrammatically represents the occurrence of a ground fault (depicted by a user 300 coming in contact with ground and the load. As in the case of FIG. 4, line current from the power source cable plant is again coupled through the first transformer winding 110 of transformer 100, and then through the line to the normally closed contacts 56 of the GFI switch 55 feeding the load 60. This flow of line current through the first transformer winding 110 induces a first magnetic field component within the toroidal core 101 of the first transformer 100. However, because of the ground fault, return current from the load 60, rather than being coupled through the normally closed contact 57 of the GFI switch, the neutral lead and the second toroidal winding 120 of transformer 100, is partially diverted to earth ground due by the user 300, so that the current over the neutral lead is drastically reduced in comparison to that supplied over line 21. Therefore, the magnetic field induced in core 101 by the current flowing through the second winding 120 will be considerably less than that induced by the first winding 110, resulting in a non-zero differential magnetic field being produced in the core 101. This magnetic field is coupled to the third, current sense winding 130 of the first transformer 100, so that a current is induced in the third winding 130. The induced current is again coupled to the fourth winding 140 wound around the toroidal core 201 of the second transformer 200, so as to induce a magnetic field in core 201 that is equal to the non-zero resultant magnetic field produced in the core 101 of the first transformer 100.

The current flowing in the ground lead 23 owing to the presence of the EMI filter capacitors C1 and C2 is again supplied through the fifth winding 150, so as to induce in core 201 of the second transformer 200 a non-zero magnetic field. However, this EMI-based magnetic field associated with internal current imbalances is much smaller than that associated with an external ground fault, and induced by the current supplied to the fourth winding 140 by the third winding 130. This means that the two magnetic fields induced into the core 201 of transformer 200 by windings 140 and 150 do no cancel each other, leaving a non-zero differential magnetic field in the core 201 of the second transformer 200. As a consequence, a resultant current is induced in the ground fault sense winding 160 of the second transformer 200, so that a switch activation signal is supplied to the GFI switch 55, causing its associated contacts 56 and 57 to open, thereby interrupting the ground fault, and protecting the user, as intended.

Figure 6:
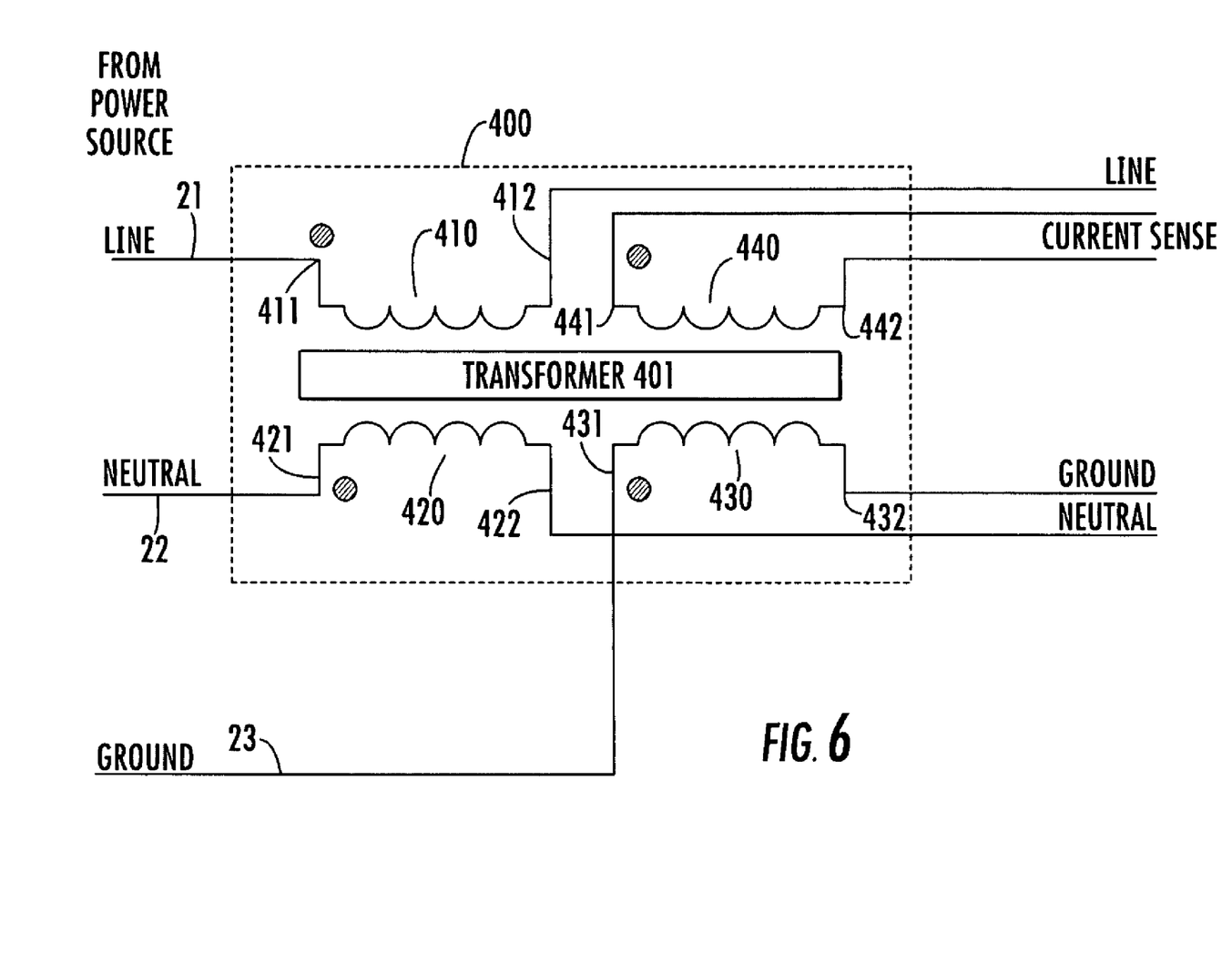
FIG. 6 shows a second, single transformer-based embodiment of the transformer interface arrangement of the present invention.

Attention is now directed to the FIG. 6, which shows a second, single transformer-based embodiment of the transformer interface arrangement of the present invention for coupling line, neutral and ground leads of a power supply cable plant to an electrically powered device and a ground fault interruption circuit therefor. Pursuant to this embodiment, a single, quadrifilar-wound toroidal transformer 400 containing four windings is employed. More particularly, as in the first embodiment the 'hot' line lead 21 is coupled to a first end 411 of a first toroidal winding 410, which is wound around ferrite toroidal core 401 of transformer 400. A second end 412 of winding 410 is coupled over the line 21 to a first normally closed contact of the GFI switch (not shown) as in the first embodiment. Also, as in the first embodiment, the neutral lead 22 is coupled to a first end 421 of a second toroidal winding 420 wound around ferrite toroidal core 401 of transformer 400. A second end 422 of winding 420 is coupled over the line 22 to a second normally closed contact of the GFI switch (not shown) as in the first embodiment. The earth ground lead 23 from the power supply is coupled to a first end 431 of a third winding, which has a second end 432 thereof coupled to the earth ground lead to which the EMI filter capacitors (not shown) are connected, as in the first embodiment. The second embodiment further includes a fourth winding 440 having respective first and second end terminals 441 and 442 thereof coupled to the GFI switch (not shown) which controls the opening and closure of the GFI switch contacts. The second embodiment of FIG. 6 operates as follows.

In the case of normal operation (including EMI protection) where no ground fault is present, line current from the power source cable plant is coupled through the first transformer winding 410 and then through the line to the normally closed contacts of the GFI switch feeding the load. This flow of line current through the first transformer winding 410 induces a first magnetic field component within the toroidal core 401 of the transformer 400. Return current from the load is coupled through the normally closed contact of the GFI switch, the neutral lead and the second toroidal winding 420 of transformer 400. Due to the presence of EMI filter by-pass capacitors coupled to earth ground, the magnitude of the current returned over the neutral lead 22 is less than that supplied over line 21, so that the magnetic field induced in core 401 by the current flowing through the second winding 420 will be less than that induced by the first winding 410, resulting in a non-zero differential magnetic field being produced in the core 401. This magnetic field is countered by the flow of current through via ground lead 23 through the third winding 430 of the transformer 400, so that the resultant magnetic field in the transformer's core 401 is zero, and no current is induced in the fourth (current sense) winding 430. Therefore, as in the first embodiment, with no current induced in the winding 430, no signal is delivered to the GFI switch to open its contacts, so that the filtering of EMI noise has no effect on the operation of the circuit.

Consider now the case of a ground fault, associated with a user coming in contact with ground and the load. As in the first embodiment, line current from the power source cable plant is again coupled through the first transformer winding 410 and then through the line to the normally closed contacts of the GFI switch feeding the load. This flow of line current through the first winding 410 induces a first magnetic field component within the toroidal core 401 of the transformer 400. However, return neutral current from the load, rather than being coupled through the normally closed contact of the GFI switch, the neutral lead 22 and the second toroidal winding 420 of transformer 400 is, instead, partially diverted to earth ground by the user, so that the current over the neutral lead is considerably reduced in comparison to that supplied over line 21. This causes the magnetic field induced in the transformer core 401 by the current flowing through the second winding 420 to be significantly less than that induced by the first winding 410, resulting in a substantial non-zero differential magnetic field produced in the core 401. A further current component is coupled over the earth ground lead 23 to the third winding 430, owing to the presence of the EMI filter capacitors, as in the first embodiment, and induces a ground current-based magnetic field in the core 401. However, this magnetic field is much smaller than the substantial, non-zero differential magnetic field induced by the currents supplied to the first and second windings 410 and 420, respectively. This means that the magnetic fields induced into the core 401 of transformer 400 do not cancel each other, leaving a non-zero differential magnetic field in the transformer core 401. As a consequence, a resultant non-zero current is induced in the ground fault sense winding 440. This current is supplied as a switch activation signal to the GFI switch from the output leads from winding 440, causing its associated contacts open, so as to interrupt the ground fault, and protect the user, as intended.

As will be appreciated from the foregoing description, the inability of conventional ground fault interrupt circuits to distinguish between non-hazardous internal current imbalances, in particular, EMI noise, and true external ground faults, which are hazardous, is effectively remedied by the transformer interface arrangement of the present invention, which is configured to mutually cancel out internal current imbalances, on the one hand, so that they do not trigger false ground fault indications, yet is sensitive to the occurrence of a true ground fault so that the ground fault will be interrupted and thereby protect a user as intended.

While I have shown and described several embodiments in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. An apparatus comprising:
    a first input port arranged to be coupled to a first voltage terminal of a source of power;
    a second input port arranged to be coupled to a second voltage terminal of the source of power;
    a third input port arranged to be coupled to ground potential;
    a first output port arranged to be coupled by way of a ground fault interrupt circuit to a first terminal of an electrical load;
    a second output port arranged to be coupled by way of the ground fault interrupt circuit to a second terminal of said electrical load;
    a third output port arranged to be coupled by way of a filter circuit to said first and second terminals of said electrical load; and
    an interface circuit, coupled to said first, second and third input ports and to said first, second and third output ports, and being operative to prevent the operation of said filter circuit from triggering the operation of said ground fault interrupt circuit.

2. The apparatus according to claim 1, wherein said interface circuit comprises at least one transformer having windings coupled in circuit with said first, second and third input ports and with said first, second and third output ports.

3. The apparatus according to claim 2, wherein said interface circuit comprises a transformer having a first winding coupled in circuit with said first input and output ports, a second winding coupled in circuit with said second input and output ports, a third winding coupled in circuit with said third input and output ports, and a fourth winding coupled to said ground fault interrupt circuit.

4. The apparatus according to claim 3, wherein said transformer includes a toroidally configured core on which said first, second, third and fourth windings are wound.

5. The apparatus according to claim 3, wherein said transformer includes a first toroidally configured core around which said first and second windings are wound, and a second toroidally configured core around which said third and fourth windings are wound, and further including a fifth winding wound around said first toroidally configured core, and a sixth winding wound around said second toroidally configured core and coupled in parallel with said fifth winding.

6. An apparatus for preventing a false ground fault interrupt in a power supply arrangement having a line wire and a neutral wire connected by way of a ground fault interrupt circuit to an electrically powered device, and including a ground wire to which said electrically powered device is coupled, said apparatus comprising:
    a current imbalance sensor coupled to said line wire and said neutral wire and being operative to generate a first output representative of a current imbalance between said line wire and said neutral wire;
    a ground wire current sensor coupled to said ground wire and being operative to generate a second output representative of current through said ground wire;
    a detector, coupled to said current imbalance sensor and to said ground wire current sensor, and being operative to trigger operation of said ground fault interrupt circuit in response to said second output having a prescribed relationship with said first output.

7. The apparatus according to claim 6, wherein said detector is operative to trigger operation of said ground fault interrupt circuit in response to said second output being different from said first output by a prescribed value.

8. The apparatus according to claim 6, wherein said current imbalance sensor comprises a first transformer core having a first winding coupled in circuit with said line wire and a second winding coupled in circuit with said neutral wire, and a third winding which is operative to generate said first output.

9. The apparatus according to claim 8, wherein said ground wire current sensor comprises a second transformer core having a fourth winding coupled in circuit with said ground wire, said fourth winding being operative to generate said second output.

10. The apparatus according to claim 9, wherein said detector comprises a fifth winding on said second transformer core coupled in parallel with said third winding on said first transformer core, and a sixth winding on said second transformer core coupled to said ground fault interrupt circuit.

11. The apparatus according to claim 10, wherein said first and second transformer cores comprise toroidally configured cores.

12. The apparatus according to claim 6, wherein said current imbalance sensor comprises a transformer core having a first winding coupled in circuit with said line wire and a second winding coupled in circuit with said neutral wire, said ground wire current sensor comprises a third winding on said transformer core, and said detector comprises a fourth winding on said transformer core and coupled to said ground fault interrupt circuit.

13. The apparatus according to claim 12, wherein said transformer core comprises a toroidally configured core on which said first, second, third and fourth windings are wound.

14. A method for preventing a false ground fault interrupt in a power supply arrangement having a line wire and a neutral wire connected by way of a ground fault interrupt circuit to an electrically powered device, and including a ground wire to which said electrically powered device is coupled, said method comprising the steps of:
- (a) monitoring current flow through said line wire and said neutral wire and generating a first output representative of a current imbalance between said line wire and said neutral wire;
- (b) monitoring current flow through said ground wire and generating a second output representative of current through said ground wire; and
- (c) triggering operation of said ground fault interrupt circuit in response to said second output having a prescribed relationship with said first output.

15. The method according to claim 14, wherein step (c) comprises triggering operation of said ground fault interrupt circuit in response to said second output being different from said first output by a prescribed value.

16. The method according to claim 14, wherein
step (a) comprises monitoring current flow through said line wire by way of a first winding on a first transformer core, monitoring current flow through said neutral wire by way of a second winding on said first transformer core, and generating said first output representative of a current imbalance between said line wire and said neutral wire by way of a third winding on said first transformer core, step (b) comprises monitoring current flow through said ground wire by way of a fourth winding on a second transformer core, and step (c) comprises coupling said third winding on said first transformer core in parallel with a fifth winding on said second transformer core, and monitoring a resultant magnetic field in said second transformer core by means of a sixth winding which produces said second output.

17. The method according to claim 16, wherein said first and second transformer cores comprise toroidally configured cores.

18. The method according to claim 14, wherein
step (a) comprises monitoring current flow through said line wire by way of a first winding on a transformer core, monitoring current flow through said neutral wire by way of a second winding on said transformer core, and generating said first output representative of a current imbalance between said line wire and said neutral wire by way of a magnetic field produced in said transformer core, step (b) comprises monitoring current flow through said ground wire by way of a third winding on said transformer core, and step (c) comprises monitoring a resultant magnetic field in said transformer core by means of a fourth winding which produces said second output.

19. The method according to claim 18, wherein said transformer core comprises a toroidally configured core on which said first, second, third and fourth windings are wound.

* * * * *